United States Patent
Park

(10) Patent No.: US 12,486,124 B2
(45) Date of Patent: Dec. 2, 2025

(54) FULFILLMENT PACKING SERVICE PROVIDING DEVICE THAT PROVIDES PACKAGING OPTIMIZATION AND OPERATION METHOD THEREOF

(71) Applicant: COLOSSEUM CORPORATION, INC., Seoul (KR)

(72) Inventor: Jinsu Park, Seoul (KR)

(73) Assignee: COLOSSEUM CORPORATION, INC., Seoul (KR)

( * ) Notice: Subject to any disclaimer, the term of this patent is extended or adjusted under 35 U.S.C. 154(b) by 178 days.

(21) Appl. No.: 18/551,846

(22) PCT Filed: Mar. 28, 2022

(86) PCT No.: PCT/KR2022/004313
§ 371 (c)(1),
(2) Date: Sep. 21, 2023

(87) PCT Pub. No.: WO2022/203479
PCT Pub. Date: Sep. 29, 2022

(65) Prior Publication Data
US 2024/0199351 A1    Jun. 20, 2024

(30) Foreign Application Priority Data

Mar. 26, 2021 (KR) .......... 10-2021-0039387
Mar. 26, 2021 (KR) .......... 10-2021-0039388
Mar. 26, 2021 (KR) .......... 10-2021-0039392

(51) Int. Cl.
*B65G 57/22* (2006.01)
*G06Q 10/083* (2024.01)

(52) U.S. Cl.
CPC .......... *B65G 57/22* (2013.01); *G06Q 10/083* (2013.01)

(58) Field of Classification Search
CPC .............................. B65G 57/22; G06Q 10/083
(Continued)

(56) References Cited

U.S. PATENT DOCUMENTS 7,145,563 B2 *  12/2006  Yamagata ............... G06T 17/20
                                              345/423
9,789,985 B2    10/2017  Winkler et al.
9,828,128 B1 *  11/2017  Linnell ................... B65B 57/00

FOREIGN PATENT DOCUMENTS

KR   10-2013-0020343 A    2/2013
KR   10-2018-0049321 A    5/2018
(Continued)

OTHER PUBLICATIONS

"Routing Methodology for Heavy-Weight and Oversized Loads Carried by Rail Transport" Published by Elsevier (Year: 2016).*
(Continued)

*Primary Examiner* — Zeina Elchanti
(74) *Attorney, Agent, or Firm* — BROADVIEW IP LAW, PC

(57) ABSTRACT

A method of operating a fulfillment packing service providing device according to an embodiment of the present disclosure may include a registration step of registering product information received from a seller terminal; a management step of extracting and storing load variable information for products included in the product information; an input step of receiving purchase information received from a purchaser terminal; an analysis step of analyzing a solid shape packaging method of purchased products using the product information and the load variable information based on the purchase information, and recommending shipment packaging information through the analysis; and a processing step of providing the purchase information and the
(Continued)

shipment packaging information to a warehouse center terminal to process shipment.

17 Claims, 5 Drawing Sheets

(58) Field of Classification Search
USPC .......................................................... 705/330
See application file for complete search history.

(56) References Cited

FOREIGN PATENT DOCUMENTS

| KR | 10-2201283 B1 | 1/2021 |
| KR | 10-2021-0031072 A | 3/2021 |

OTHER PUBLICATIONS

International Search Report & Written Opinion for PCT/KR2022/004313 by Korean Intellectual Property Office dated Jul. 5, 2022.

\* cited by examiner

Packing Result

| Box information | W | H | L | QTY |
|---|---|---|---|---|
| Ultra small No. 3 | 35 | 25 | 15 | 1 |
| Product name | W | H | L | QTY |
| 1. Gongjindan | 1 | 2 | 5 | 1 |
| 2. Healthy diet, Book 1 | 15 | 30 | 3 | 1 |
| 3. Cracker | 5 | 5 | 20 | 4 |
| 4. True taste dried snack | 15 | 5 | 15 | 3 |
| 5. Vitamin C | 20 | 28 | 2 | 1 |
| 6. Vitamin complex | 6 | 6 | 6 | 1 |

FULFILLMENT PACKING SERVICE PROVIDING DEVICE THAT PROVIDES PACKAGING OPTIMIZATION AND OPERATION METHOD THEREOF

CROSS-REFERENCE TO RELATED APPLICATIONS

This application is a National Phase Entry Application of PCT Application No. PCT/KR2022/004313, filed on Mar. 28, 2022, which claims priority to Korean Patent Application No. 10-2021-0039387, filed on Mar. 26, 2021, Korean Patent Application No. 10-2021-0039388, filed on Mar. 26, 2021, and Korean Patent Application No. 10-2021-0039392, filed on Mar. 26, 2021, in Korean Intellectual Property Office, the entire contents of which are hereby incorporated by reference in its entirety.

TECHNICAL FIELD

The present disclosure relates to a fulfillment packing service providing device based on a three-dimensional shape and a method of operating the same. More specifically, the present disclosure relates to a fulfillment packing service providing device, based on a three-dimensional shape, that provides a fulfillment packing service by acquiring an optimized multi-packaging method through a three-dimensional shape analysis for each product according to a purchaser's purchase information, and an operation method thereof.

BACKGROUND ART

Electronic commerce, expressed as e-commerce, means a transaction in which products and services are bought and sold in real time using the Internet through a virtual market opened on-line. The electronic commerce is rapidly spreading through an increase in the Internet users and the utilization of smartphones based on the development of ICT technologies.

In recent years, the utilization of e-commerce, which is a non-face-to-face type of product purchase method that is not limited by time and space, is growing exponentially as social environment variables that lead to non-face-to-face lives have been brought about.

In addition, through e-commerce, time constraints on sales may be removed for sellers, and efficiency may be improved for purchasers to reduce the troubles of visiting offline stores and searching for product information. The efficiency of fulfillment services that maintain the quality and value of products, reduce the work and costs of sellers and warehouse owners, and execute a professional logistics service on behalf thereof may be considered as an important factor in a packaging method of purchased products shipped to purchasers through e-commerce.

For packaging management of purchased products through e-commerce, 'Packaging Management Method for Shipment Products' is disclosed in Korean Patent Publication No. 10-2005-0008925. In the published patent application, which relates to a method of performing multi-packaging for products shipped to the same shipping address to ship the products, there are disclosed a packaging management method of determining whether two or more products with the same shipping address information are ordered, when there are two or more products with the same shipping address information, inquiring about estimated shipping dates of the products, respectively, to determine whether the estimated shipping dates are the same, and when the estimated shipping dates are the same, determining whether the two or more products with the same shipping address information can be packed into one so as to determine whether to perform multi-packaging, and a packaging operation monitoring method of assigning a same shipping information barcode to a plurality of products to be shipped as multi-packaging and printing a shipping information label to be attached to a packaging container including the shipping information barcode, reading the barcode of the shipping information label attached to the packaging container of the products using a barcode reader and displaying the types and quantities of the products to be packed through a packaging item checking means, reading a product information barcode attached to the products to be packed and determining whether the read products match the types and quantities of the products to be packed, which are displayed on the packaging item checking means so as to display the determination result through the packaging item checking means, and when it is determined that items to be packed completely match the read packaging products, printing an invoice to be attached to a package of the products.

However, with the above related art, there is a limitation in determining whether multi-packaging is allowed by referring to estimated shipping dates with respect to one or more products purchased by a purchaser, and in case the attributes of the products are physically or chemically affected, the multi-packaging cannot be carried out. In addition, in the related art, when multi-packaging is carried out, excessive packaging in a multi-packaging container may be brought about because a multi-packaging container is selected based on dimensions calculated by simply summing package dimensions of individual products to calculate its total volume.

DISCLOSURE OF INVENTION

Technical Problem

The present disclosure is contrived to solve the foregoing problems, and an aspect of the present disclosure is to provide a fulfillment packing service providing device, based on a three-dimensional shape, capable of recommending an optimized multi-packaging method through product information on one or more purchased products and a packing 3D solid shape analysis thereof in a fulfillment service that provides comprehensive logistics services according to the vitalization of the e-commerce industry, and an operation method thereof.

Technical Solution

In order to solve the foregoing problems, a method according to an embodiment of the present disclosure, which is a method of operating a fulfillment packing service providing device, may include a registration step of registering product information received from a seller terminal; a management step of extracting and storing load variable information for products included in the product information; an input step of receiving purchase information received from a purchaser terminal; an analysis step of analyzing a solid shape packaging method of purchased products using the product information and the load variable information based on the purchase information, and recommending shipment packaging information through the analysis; and a processing step of providing the purchase information and the shipment packaging information to a warehouse center terminal to process shipment.

In addition, in order to solve the foregoing problems, a device according to an embodiment of the present disclosure, which is a fulfillment packing service providing device, may include a registration unit that registers product information received from a seller terminal; a management unit that manages load variable information for products included in the product information; an input unit that receives purchase information received from a purchaser terminal; a packaging analysis unit that analyzes a solid shape packaging method of purchased products included in the purchase information using the product information and the load variable information and outputs shipment packaging information as a result of the analysis; and a shipment processing unit that provides the purchase information and the shipment packaging information to a warehouse center terminal.

Meanwhile, in order to solve the foregoing problems, the method according to an embodiment of the present disclosure may be implemented as a computer program stored in a computer-readable recording medium for executing the method on a computer.

Advantageous Effects

According to an embodiment of the present disclosure, a multi-packaging method of products corresponding to a purchaser's purchase information based on information on products registered by a seller may be optimized so as to minimize waste of packaging material resources and costs due to excessive packaging, multi-packaging for products may be performed and managed in an integrated manner so as to check missing products prior to shipment, and efficient handling of transportation and shipment may be provided through multi-packaging. In addition, as a fitting arrangement of 3D solid objects and a load method that minimizes a hollow therein are modeled, inefficient packaging processing work based on the experience and subjective judgment of a person in charge of packaging work may be replaced.

BEST MODE FOR CARRYING OUT THE INVENTION

Figure 1:
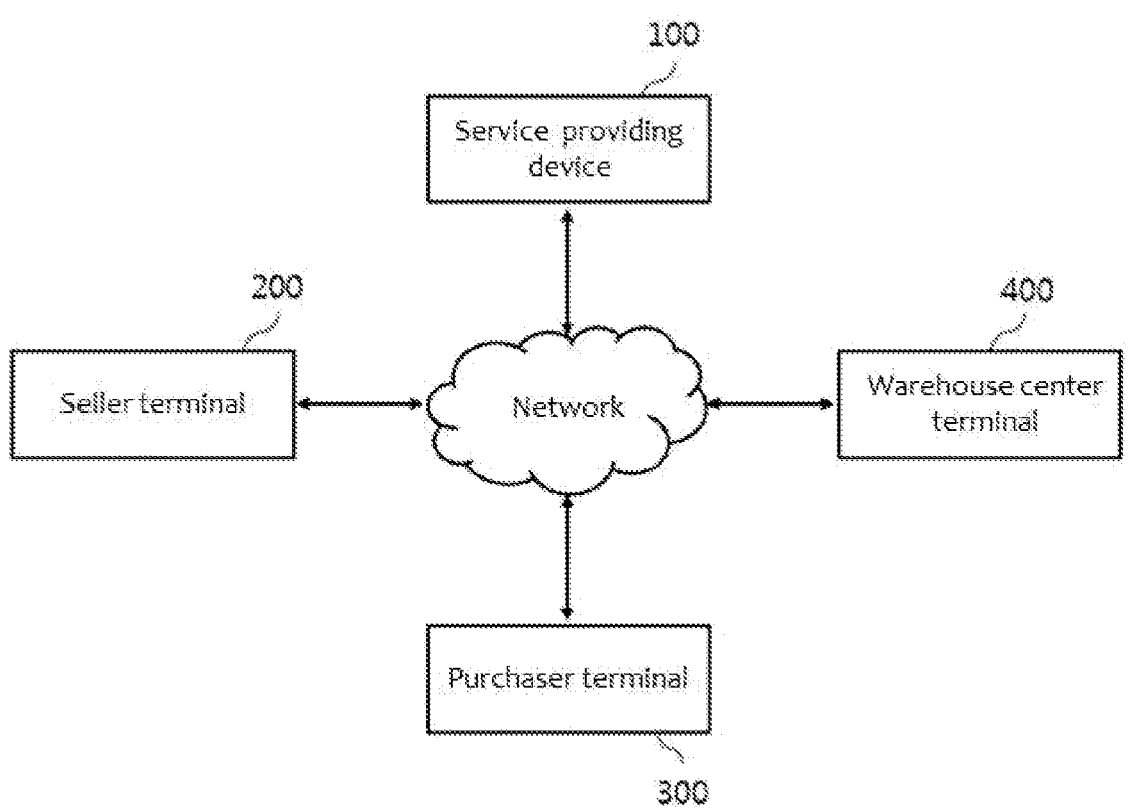
FIG. 1 is a conceptual diagram schematically showing an overall system according to an embodiment of the present disclosure.

The following description illustrates the principles of the present disclosure. It will thus be appreciated that those skilled in the art will be able to devise various devices that, although not explicitly described or shown herein, embody the principles of the invention and are included in the spirit and scope of the present disclosure. Furthermore, all conditional terms and embodiments recited herein are intended only for pedagogical purposes to aid the reader in understanding the principles of the invention, and are to be construed as being without limitation to such specifically recited embodiments and conditions.

Moreover, all detailed description herein reciting the principles, aspects, and embodiments of the invention as well as specific embodiments thereof are intended to encompass both structural and functional equivalents thereof. Additionally, it is intended that such equivalents include both currently known equivalents as well as equivalents to be developed in the future, i.e., any elements developed to perform the same function regardless of its structure.

Thus, for example, it will be appreciated by those skilled in the art that the block diagrams presented herein represent the conceptual view of an exemplary circuit that embodies the principles of the invention. Similarly, it will be appreciated that any flow charts, flow diagrams, state transition diagrams, pseudocodes, and the like represent various processes which may be substantially represented in computer readable media and so executed by a computer or processor, whether or not such a computer or processor is explicitly shown.

In addition, explicit use of the terms presented as processors, controls, or concepts similar thereto should not be interpreted by exclusively quoting hardware having an ability of executing software, and should be understood to implicitly include, without limitation, digital signal processor (DSP) hardware, and ROM, RAM and non-volatile memory for storing software. Other known common hardware may also be included.

It should be noted that the terms used herein are merely used to describe a specific embodiment, but not to limit the present disclosure. As used herein, the singular forms are intended to include the plural forms as well, unless the context clearly indicates otherwise. Terms "include" or "have" used herein should be understood that they are intended to indicate the existence of a feature, a number, a step, a constituent element, a component or a combination thereof disclosed in the specification, and it may also be understood that the existence or additional possibility of one or more other features, numbers, steps, constituent elements, components or combinations thereof are not excluded in advance.

The foregoing objects, features and advantages will be more obvious through the following detailed description associated with the accompanying drawings, and accordingly, the technological concept of the present disclosure can be easily implemented by a person having ordinary skill in the art to which the present disclosure pertains. In carrying out the present disclosure, moreover, the detailed description will be omitted when a specific description for publicly known technologies to which the invention pertains is judged to obscure the gist of the present disclosure.

Hereinafter, preferred embodiments according to the present disclosure will be described in detail with reference to the accompanying drawings.

FIG. 1 is a conceptual diagram schematically showing an overall system according to an embodiment of the present disclosure.

Referring to FIG. 1, a system according to an embodiment of the present disclosure may include a service providing device 100, a seller terminal 200, a purchaser terminal 300, and a warehouse center terminal 400.

More specifically, the service providing device 100, the seller terminal 200, the purchaser terminal 300, and the warehouse center terminal 400 may be connected to a public network in at least one of wired and wireless manners to transmit and receive data thereto and therefrom. The public network, which is a communication network established and managed by the state or key telecommunications service providers, generally includes a telephone network, a data network, a CATV network, a mobile communication network, and the like, and provides connection services so that an unspecified number of people can access other communication networks or the Internet. In the present disclosure, the public network is replaced with a network.

Furthermore, the service providing device 100 may include each communication module for communicating with the seller terminal 200, the purchaser terminal 300, and the warehouse center terminal 400 using a protocol corresponding to each communication network.

The service providing device 100 may provide an e-commerce platform in which a seller who is an online seller and a warehouse owner who owns a warehouse center are networked with each other. The service providing device 100 provides all-round logistics services such as warehousing and storage of products, release and shipment of a purchaser's order, return, settlement, and inventory management so as to increase the concentration of product manufacturing or sourcing work and reduce costs on behalf of the seller. Furthermore, the service providing device 100 may connect the seller to the warehouse owner so as to maximize the utilization of the warehouse center through securing goods.

In this way, the service providing device 100 may provide professional logistics services that can reduce logistics work and related costs on behalf of the seller and the warehouse owner, thereby efficiently providing a purchased product to the purchaser.

Here, the service providing device 100 may provide a packaging service for protecting the value and condition of a product in the process of transportation, storage, handling, and the like, performed for services such as the release and shipment of the product according to purchase order information. In particular, the service providing device 100 may provide a packaging or packing optimization service capable of efficiently using packaging resources and reducing costs therethrough in addition a basic function of the packaging service to protect the value and condition of products. The service providing device 100 may recommend an optimal box size for unit packaging or multi-packaging with respect to one or more purchased products ordered by a specific purchaser. In addition, the service providing device 100 may process a multi-shipping order through multi-packaging with respect to a purchaser's purchase order.

The service providing device 100 may be connected to the seller terminal 200, the purchaser terminal 300, and the warehouse center terminal 400 through a wired/wireless network to provide a packing optimization service for purchased products. Devices or terminals connected to the network may communicate with each other through a preset network channel.

Here, the network may be implemented in all types of wired/wireless networks such as a Local Area Network (LAN), a Wide Area Network (WAN), a Value Added Network (VAN), a Personal Area Network (PAN), a mobile radio communication network, a satellite communication network, or the like.

The service providing device 100 may be implemented as a server device that performs overall functions and roles as a web server, a database, a web application server, and the like.

In addition, the seller terminal 200, the purchaser terminal 300, and the warehouse center terminal 400 described herein include a personal computer (PC), a laptop computer, a digital broadcasting terminal, a personal digital assistant (PDA), and a portable multimedia player (PMP), and the like may be included therein, but the present disclosure may not be limited thereto, and other various devices capable of user input and information display may be included therein.

Additionally, the seller terminal 200, the purchaser terminal 300, and the warehouse center terminal 400 may not be limited to the device classification and may include a server device that can upgrade and expand data processing, storage, and management functions.

Figure 2:
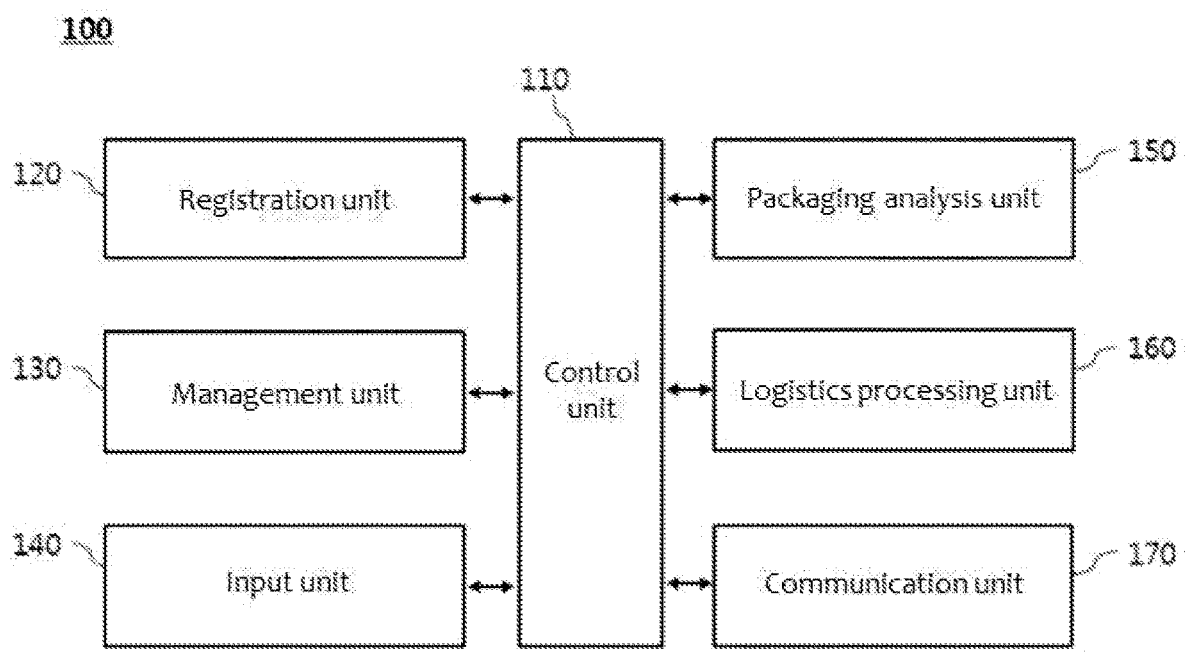
FIG. 2 is a block diagram showing in more detail a fulfillment packing service providing device according to an embodiment of the present disclosure.
Figure 3:
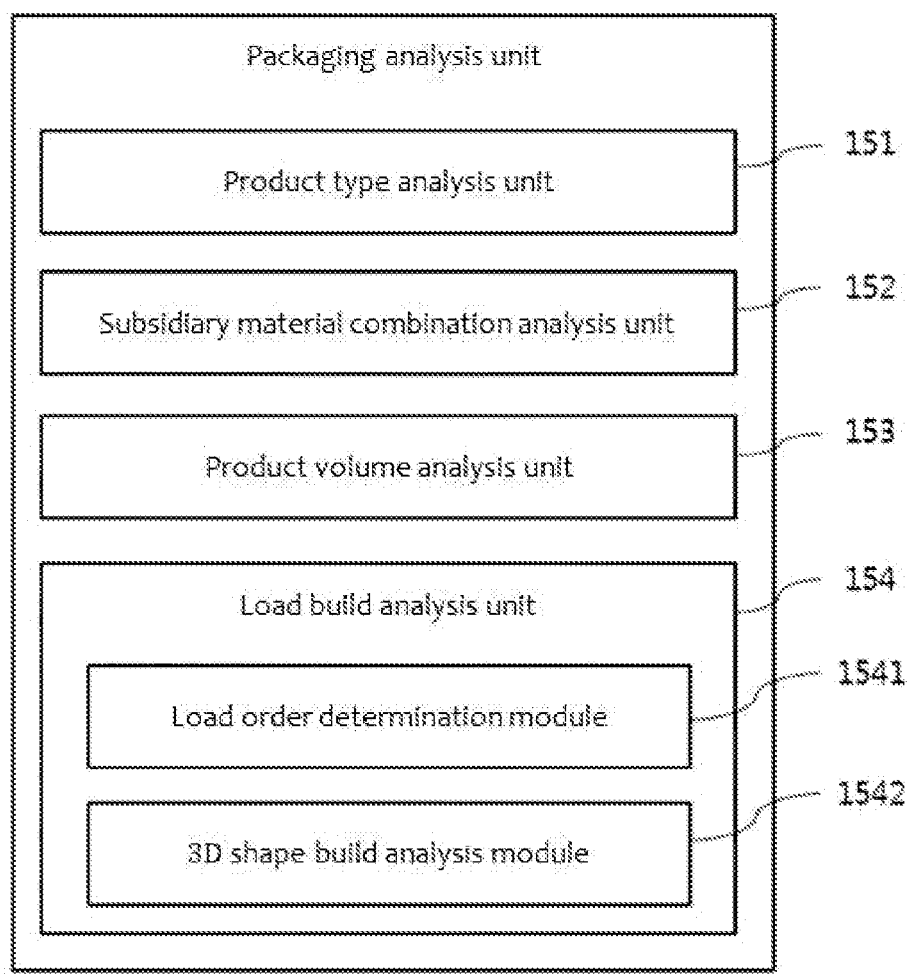
FIG. 3 is a block diagram showing in more detail a packaging analysis unit in the fulfillment packing service providing device according to the embodiment of the present disclosure.

FIG. 2 is a block diagram showing in more detail a fulfillment packing service providing device according to an embodiment of the present disclosure, and FIG. 3 is a block diagram showing in more detail a packaging analysis unit in the fulfillment packing service providing device according to the embodiment of the present disclosure.

Referring to 2 and 3, the service providing device 100 according to an embodiment of the present disclosure may include a control unit 110, a registration unit 120, a management unit 130, an input unit 140, a packaging analysis unit 150, a shipment processing unit 160, and a communication unit 170. The packaging analysis unit 150 may include a product type analysis unit 151, a subsidiary material combination analysis unit 152, a product volume analysis unit 153, and a load build analysis unit 154. Additionally, the load build analysis unit 154 may include a load order determination module 1541 and a three-dimensional (3D) shape build analysis module 1542.

The control unit 110 may control an overall operation of each module to provide operation processing according to a service providing method according to an embodiment of the present disclosure, and may include one or more microprocessors for this purpose.

The registration unit 120 may register product information received from the seller terminal 200. The product information may include detailed information on products manufactured by the seller or secured through sourcing. Specifically, the product information may include a product name, a product image, quantity held, item classification information, capacity or weight, size information, storage method, handling method, volume calculation information of a unit product, and the like.

The volume calculation information of the product may include length information on the width, length, and height of a prototype of the product. In addition, the volume calculation information of the product may be length information on the width, length, and height measured based on a single packaging condition to protect the good and maintain its value.

The management unit 130 may manage load variable information for products included in the product information. The management unit 130 may store and manage the load variable information for each unit product. The load variable information may include a capacity, a weight, a volume, volume calculation information, a hardness, a safety level against damage, and the like that can be measured for each unit product. The load variable information may be used to determine a load order for products purchased by a purchaser and an arrangement form of products in a load layer.

The load variable information may be quantitatively corresponded to a measured value or an evaluation value so as to be compared with a relative value. For example, weight may be expressed as a mass value that can be measured in units of kg, g, mg, and the like. Furthermore, the safety level against damage may be evaluated as a degree of risk that the quality and value of products provided in the form of food, glass, paper, and the like may be deformed by an external pressure or impact, thereby damaging the quality and value thereof The safety level against damage is a value obtained by evaluating a level of safety against the damage risk, and evaluation information may be numerically matched such as '3' for safe, '2' for normal, and '1' for risky. In addition, the volume, which is a value obtained by measuring a size occupying a space, may be acquired in units such as $mm^3$, $cm^3$, $m^3$, or the like. Additionally, evaluation information may be numerically matched, such as '3' for hard, '2' for normal, and '1' for soft. The evaluation information such as the safety level against damage and the hardness may be evaluated by utilizing information in which a degree of deformation is predictable according to an external pressure, an impact or the like according to product category information, a product provision type, a product manufacturing material, a product item type, and the like in the product information.

The input unit 140 may receive purchase information received from the purchaser terminal 300. The input unit 140 may include purchase information such as product selection information desired to be purchased and information required for shipment through the purchaser terminal 300. The input unit 140 may refer to unique identifiers such as member ID, order request date, delivery request address, and the like, from the purchase information to carry out integrated processing so as to perform multi-packaging or multi-shipment according to the selection information of the purchaser terminal 300.

The packaging analysis unit 150 may analyze a solid shape packaging method of purchased products included in the purchase information using the product information and the load variable information, and output shipment packaging information as a result of the analysis. Furthermore, the packaging analysis unit 150 may recommend shipment packaging information through an analysis of the solid shape packaging method of the purchased products. The packaging analysis unit 150 may present one or more packaging method models through the solid shape packaging method.

The packaging analysis unit 150 may recommend recommended shipment packaging information through criteria for efficiently using packaging materials for an outermost most shape of packaging or minimizing a volume value of a hollow formed therein, among the packaging method models. The shipment packaging information may include volume information of a packaging container or box forming an outermost shape. The shipment packaging information may include a list of packed purchased products and information such as volume information and quantity of each purchased product.

The packaging analysis unit 150 may use product information for each product with respect to one or more purchased products included in the purchase information. In addition, the packaging analysis unit 150 may acquire the load variable information corresponding to the purchased product. Through this, the packaging analysis unit 150 may acquire objectification information by modeling a solid shape of the purchased product.

The packaging analysis unit 150 may analyze a packaging method in which an outermost package volume can be a minimum value when multi-packaging is performed by using the objectification information. The packaging analysis unit 150 may determine an optimized multi-packaging method through the analysis of the packaging method and recommend the shipment packaging information.

The packaging analysis unit 150 may include a product type analysis unit 151.

The product type analysis unit 151 may store product classification information acquired through type classification for each product with respect to one or more products corresponding to the purchase information.

The product type analysis unit 151 may set a predetermined criterion for the type classification for each product. The product type analysis unit 151 may subclassify types based on product category. For example, the product category may be classified into food, fashion, beauty, kitchen products, cleaning products, furniture, baby products, leisure products, home appliances, and hobby products. The product type analysis unit 151 may classify products based on criteria capable of physically or chemically preventing the deterioration, deformation, damage or the like of the products. To this end, the product type analysis unit 151 may classify products into products requiring refrigeration, products requiring freezing, products requiring handling with care, and the like, and store them as product classification information. The product type analysis unit 151 may manage information that classifies products according to the physical or chemical properties of the products as product classification information, thereby utilizing the product classification information as information for determining a packaging method to maintain the value and quality of the products.

The packaging analysis unit 150 may further include a subsidiary material combination analysis unit 152.

The subsidiary material combination analysis unit 152 may analyze the volume information of packaging subsidiary materials in accordance with the packaging subsidiary materials that maintain the quality and value of products according to the product classification information to allow the volume information of the packaging subsidiary materials to be included in the load variable information. The subsidiary material combination analysis unit 152 may select an ice pack, an air cap, a cushioning material, and the like as the packaging subsidiary materials according to the physical or chemical properties of the purchased products to prevent the deterioration, deformation or damage of the products. The subsidiary material combination analysis unit 152 may calculate an input amount with respect to packaging subsidiary materials corresponding to products, and acquire the volume information of the packaging subsidiary materials for the input amount. Through this, the subsidiary material combination analysis unit 152 may calculate the volume of the packaging subsidiary materials combined with the purchased products to allow the volume information of the packaging subsidiary materials to be included in the load variable information for each product. Furthermore, the subsidiary material combination analysis unit 152 may determine the input of a bulkhead or an additional external packaging subsidiary material for a product that needs to be separated according to the characteristics of the packaging subsidiary material added to the purchased product. For example, when the purchase information includes frozen food and clothes, it is necessary to separate the clothes so as not to be damaged by dry ice or ice packs being added thereto to maintain the quality of the frozen food. At this time, the auxiliary material combination analysis unit 152 may additionally input external packaging auxiliary materials, which may include packaging auxiliary materials for frozen food and ice packs or dry ice to separate therefrom.

The packaging analysis unit 150 may further include the product volume analysis unit 153.

The product volume analysis unit 153 may acquire one or more primary product packaging volume information corresponding to a packaging method for each product group classified into a specific item group in the purchased products and determined by the corresponding packaging method based on the product classification information and the load variable information. The product volume analysis unit 153 may check whether the purchased products are individually packed or not, and calculate primary product packaging volume information in which the products are packed individually or in a bundle. In addition, the product volume analysis unit 153 may determine whether to add a package having a hexahedral form according to the physical or chemical properties of the individually packed purchased products to calculate the primary product packaging volume information.

The packaging analysis unit 150 may further include the load build analysis unit 154.

The load build analysis unit 154 may determine a load method and secondary product package volume information through the analysis of a load order or a load arrangement form based on the load variable information and the primary product packaging volume information.

The load build analysis unit 154 may include the load order determination module 1541. The load order determination module 1541 may acquire the load order information by reflecting a weighted value (WEIGHT) corresponding to a preset importance indicator with respect to information, such as a weight, a hardness, a volume, and a safety level against damage, extracted from the load variable information.

The importance indicator may be set among load variable information that must be considered to maintain the quality and value of products. The importance indicator may be set by selecting at least one of a weight, a hardness, a volume, a safety level against damage, and the like.

The load order determination module 1541 may assign a weighted value to the importance indicator. The weighted value may be assigned to one or more values by varying designation values so as to differentiate the importance of load variable information designated as an importance indicator.

When the load order determination module 1541 designates the importance indicator as one load variable information, a load order may be determined according to single load variable information. The load order determination module 1541 may determine a load order by analyzing integer values among purchased products using the single load variable information and position the products into a packaging container.

For the load order, as the order of execution is prioritized, it may be relatively positioned at a bottom of the packaging container. In addition, the load order determination module 1541 may preset whether to prioritize the load order based on an ascending order or a descending order with respect to integer values calculated as load variable information.

According to an embodiment of the present disclosure, the load order determination module 1541 may prioritize importance indicators in the order of a weight, a damage risk, a volume, and a hardness from load variable information such as a weight, a hardness, a volume, and a safety level against damage. Here, the load order determination module 1541 may assign the weight, safety level against damage, volume, and hardness, which are importance indicators, to a default value of '1' and specify weighted values to '2.5', '2', '1.5' and'1' for variables, respectively. Accordingly, the load order determination module 1541 may acquire a calculated value in which the weighted values are reflected as '2.5', '2', '1.5', and '1' for the weight, the damage risk, the volume and the hardness, respectively. Accordingly, the load order determination module 1541 may determine a load order according to a mass value measured or identified for each product with respect to a weight having the highest weighted value. Alternatively, the load order determination module 1541 may determine a load order according to values compared through summation by reflecting the weighted values to the load variable information of each product.

For example, when the load variable information is a weight, the load order may be given priority as the measured or acquired mass increases. As a result, the larger the mass of the product, the more pressure may be applied to the bottom, thereby preventing an increase in the risk of deformation or damage of other products positioned at the bottom. In addition, when the load variable information is a volume, the load order may be given priority as the measured or acquired volume increases. This may allow bulky products to occupy space in a first packaging container, thereby maximize space efficiency. Furthermore, when there is no information on the mass, a load order may be determined according to the prediction that the weight may be relatively heavy as the volume increases.

Here, when extracting at least one of the importance indicators from the load variable information, the load order determination module 1541 may determine a load order using only a specific indicator having the highest priority, and also comparison may be made through the summation of weighted values in all indicators to determine the load order.

For example, the load order determination module 1541 may analyze information in which that the weight of a first purchased product is 1 kg, the safety level against damage is '3' corresponding to 'safe', the volume is 8 cm3, and the hardness is '1' corresponding to 'soft', and the weight of a second purchased product is 2 kg, the safety level against damage is '2' corresponding to 'normal', the volume 6 cm3, and the hardness is '2' corresponding to 'normal'. The load order determination module 1541 may determine a weight having the highest weighted value as the priority of the load order. Accordingly, the load order determination module 1541 may acquire load order information for positioning the second product having the weight of 2 kg at the bottom first in the load order.

Additionally, the load order determination module 1541 may sum and compare values calculated by multiplying information measured or acquired from each product, from a weight, a safety level against damage, a volume, and a hardness, which are set as the importance indicators, by weighted values. Specifically, in the case of the first purchased product, values calculated by reflecting weighted values on the importance indicators are '2.5' for the weight, '6' for the safety level against damage, '12' for the volume, and '1' for the hardness, and thus the sum value is '21.5'. In the case of the first purchased product, values calculated by reflecting weighted values on the importance indicators are '5' for the weight, '4' for the safety level against damage, '9' for the volume, and '2' for the hardness, and thus the sum value is '20'. Through this, the load order determination module 1541 may acquire load order information for positioning the first purchased product at the bottom first in the load order.

The load build analysis unit 154 may further include a load build analysis module 1542.

The load build analysis module 1542 may perform solid modeling on the shape of a primary packaging product group based on the primary product packaging volume information. The load build analysis module 1542 may determine the load arrangement form according to a preset load algorithm using solid shape information acquired through the solid modeling and the load order information.

The load algorithm may perform fitting so as to be filled in a hexahedral shape using the solid shape information. The load algorithm may generate one or more hexahedral models that are finally filled in according to a selective arrangement form of the fitting.

The load build analysis module 1542 may select a hexahedral model that is calculated as a value that minimizes a volume value of a hollow formed therein among the hexahedral models generated by using the load algorithm, and determine it as the secondary product packaging volume information.

The load build analysis module 1542 may provide a build interface that visually displays the load form. The build interface provides a 3600 rotational view to check a load form of the solid shape information from various viewpoints.

In addition, the load build analysis module 1542 may allow a manager to directly control an arrangement form of products or a load layer structure of products using one or more solid shape information. To this end, the load build analysis module 1542 may provide a drag-and-drop function on the solid shape information within a specific space.

The load build analysis module 1542 may utilize a Maxrects (Maximal Rectangle) algorithm or the like as the load algorithm. When a first rectangular object is initially placed in a two-dimensional space of a predetermined size, with respect to a remaining region except for a region occupied by the first rectangular object, the Maxrects (Maximal Rectangle) algorithm may extend a region in an overlapping portion to the remaining region to avoid fragmentation so as to classify the extended region as an additional load region. The Maxrects (Maximal Rectangle) algorithm may arrange a second rectangle object, a third rectangle object, and the like that can be included in the additional load region to utilize the calculated region. The load build analysis module 1542 may utilize the Maxrects (maximal rectangle) algorithm by using horizontal, vertical, and height information, width, and volume that may be calculated from the three-dimensional shape information.

Here, the load build analysis module 1542 may perform fitting on one or more solid shape information according to three-dimensional coordinates using the load algorithm to determine a load form. In addition, the load build analysis module 1542 may determine lengths for a width, a depth, and a height extended as the solid shapes are selectively fitted as a volume value of the outermost packaging hexahedron.

The load build analysis module 1542 may provide logic for determining a load method. The load build analysis module 1542 may generate a hexahedron having a size including the volume of purchased products having various shapes. The hexahedron may be generated in a form capable of minimizing a hollow formed therein. The load build analysis module 1542 may position a first hexahedron having the highest priority in the load order so as to be in contact with the origin of the three-dimensional coordinates x, y, and z axes. The load build analysis module 1542 may divide a space using three edges of the hexahedron that are not in contact with the x, y, and z axes. In this case, the load build analysis module 1542 may utilize a Maxrects (Maximal Rectangle) algorithm. Thereafter, the load build analysis module 1542 may load a second hexahedron so as to be in contact with the first hexahedron, and then determine whether the second hexahedron can be included in the divided space, and position the second hexahedron in an available space. Furthermore, after the second hexahedron is positioned therein, the load build analysis module 1542 re-divides the divided space using each corner of the second hexahedron. At this time, the load build analysis module 1542 may remove an invalid space. The invalid space may be divided into a region included in another space or a region having a negative height or width value. Through this, the load build analysis module 1542 may remove an invalid space and analyze whether the hexahedrons of all products, which are subject to multi-packaging, may be included in the re-divided space. The load build analysis module 1542 may recognize an object in which hexahedrons of products overlap each other as one object, and determine dimensions of a packaging hexahedron that fits a length of the largest side.

According to an embodiment of the present disclosure, the load build analysis module 1542 may use rectangular objects having x, y, w (width), and h (height) as attributes thereof to remove an invalid space when dividing an area in a specific region. are available. Specifically, the load build analysis module 1542 may define top, bottom, left, and right spaces according to the first rectangular object that is loaded first to become a reference position, wherein "r" refers to a rectangular object, and "s" is defined as a space overlapping a rectangular object. The load build analysis module 1542 may allow rectangular objects in the top, bottom, left, and right spaces to sequentially match rt, rb, rl, and rr, respectively. Through this, the load build analysis module 1542 may acquire information rt, rb, rl, and rr as follows. For example, rt, rb, rl and rr may be calculated by using rt={x:s.x, y:s.y, w:s.w, h:r.y−s.y}, rb={x:s.x, y:r.y+r.h, w:s.w, h:s.y+s.h−(r.y+r.h)}, rl={x:s.x, y:s.y, w:r.x−s.x, h:s.h}, and rr={x:r.x+r.w, y:s.y, w:s.x+s.w−(r.x+r.w)}, respectively.

The shipment processing unit 160 may provide the purchase information and the shipment packaging information to the warehouse center terminal 400.

Figure 4:
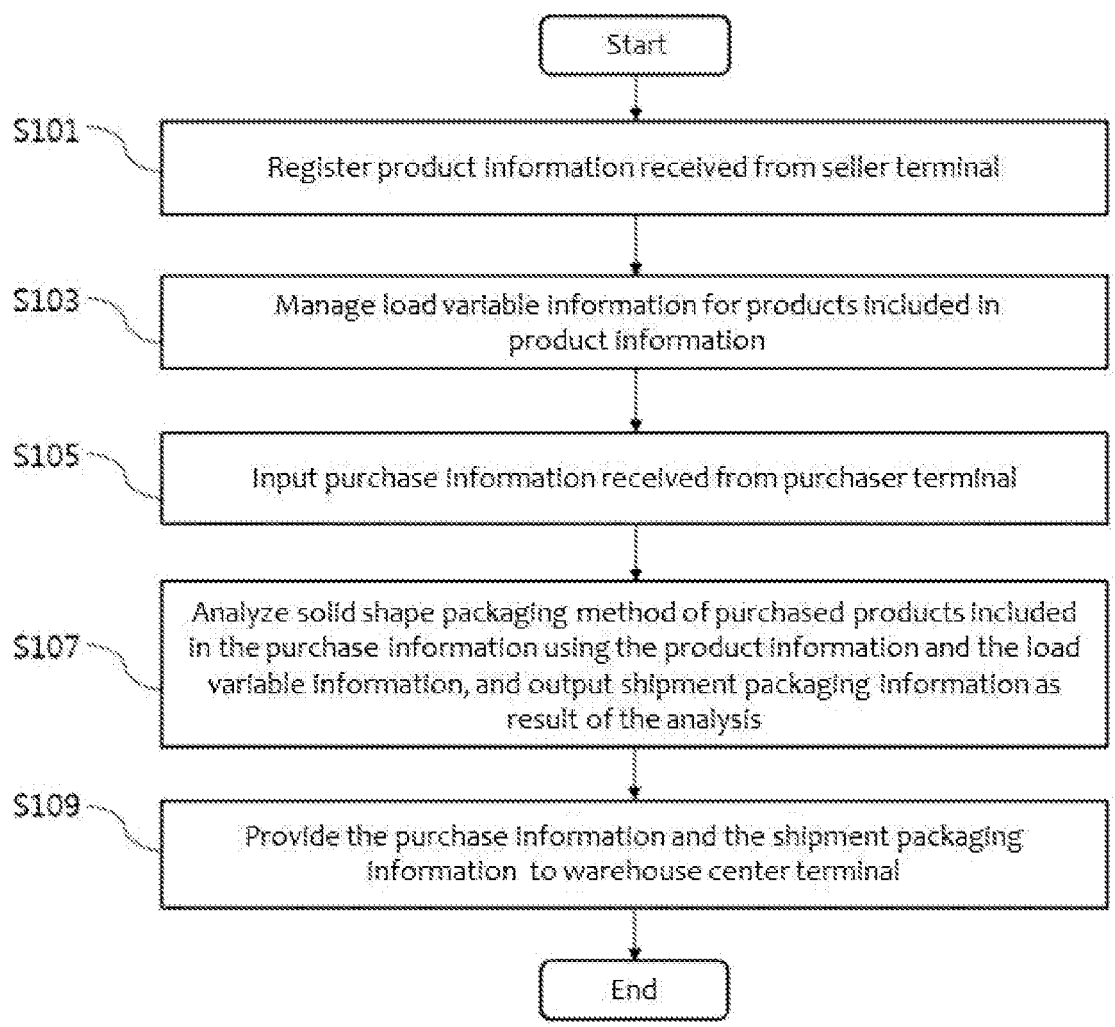
FIG. 4 is a flowchart for explaining in more detail an operation of the fulfillment packing service providing device according to the embodiment of the present disclosure.

FIG. 4 is a flowchart for explaining in more detail an operation of the fulfillment packing service providing device according to the embodiment of the present disclosure.

Referring to FIG. 4, in an operating method of a device of providing a fulfillment packing service according to an embodiment of the present disclosure, a registration step S101 may register product information received from the seller terminal 200. The product information may include detailed information on products manufactured by the seller or secured through sourcing. Specifically, the product information may include a product name, a product image, quantity held, item classification information, capacity or weight, size information, storage method, handling method, volume calculation information of a unit product, and the like.

A management step S103 may manage load variable information for products included in the product information. The load variable information may include a capacity, a weight, volume calculation information, a hardness, a safety level against damage, and the like that can be measured for each unit product. The load variable information may be used to determine a load order for products purchased by a purchaser and an arrangement form of products in a load layer.

An input step S105 may receive purchase information received from the purchaser terminal 300. The input step S105 may allow the purchase information to include product selection information desired to be purchased and information required for shipment through the purchaser terminal 300. The input step S105 may refer to unique identifiers such as member ID, order request date, delivery request address, and the like, from the purchase information or carry out integrated processing so as to perform multi-packaging or multi-shipment according to the selection information of the purchaser terminal 300.

An analysis step S1107 may analyze a three-dimensional packaging method of purchased products included in the purchase information using the product information and the load variable information, and output shipment packaging information as a result of the analysis.

The load variable information may include a capacity, a weight, volume calculation information, a hardness, a safety level against damage, and the like that can be measured for each unit product. The load variable information may be used to determine a load order for products purchased by a purchaser and an arrangement form of products in a load layer.

The analysis step S1107 may include a product type analysis step (not shown).

The product type analysis step may store product classification information acquired through type classification for each product with respect to one or more products corresponding to the purchase information.

The analysis step S107 may further include an auxiliary material combination analysis step (not shown).

The subsidiary material combination analysis unit may analyze the volume information of packaging subsidiary materials in accordance with the packaging subsidiary materials that maintain the quality of products according to the product classification information to allow the volume information of the packaging subsidiary materials to be included in the load variable information.

The analysis step S107 may further include a product volume analysis step (not shown).

The product volume analysis step may acquire one or more primary product packaging volume information corresponding to a packaging method for each product group classified into a specific item group in the purchased products and determined by the corresponding packaging method based on the product classification information and the load variable information.

The analysis step S107 may further include a load build analysis step (not shown).

The load build analysis step may determine a load method and secondary product package volume information through the analysis of a load order or a load arrangement form based on the load variable information and the primary product packaging volume information.

The load build analysis step may include a load order determination step (not shown).

The load order determination step may acquire the load order information by reflecting a weighted value (WEIGHT) corresponding to a preset importance indicator to information including at least one of a weight, a hardness, a volume, and a safety level against damage, extracted from the load variable information.

The load build analysis step may further include a 3D shape build analysis step (not shown).

The 3D shape build analysis step may perform solid modeling on the shape of a primary packaging product group based on the primary product packaging volume information, and determine the load arrangement form according to a preset load algorithm using solid shape information acquired through the solid modeling and the load order information.

The load algorithm may perform fitting so as to be filled in a hexahedral form using the solid shape information, and generate one or more hexahedral models according to a selective arrangement form of the fitting, as well as determine a hexahedral model that is calculated as a value that minimizes a volume value of a hollow formed therein among the hexahedral models as the secondary product packaging volume information.

A processing step S109 may provide the purchase information and the shipment packaging information to the warehouse center terminal 400.

Figure 5:
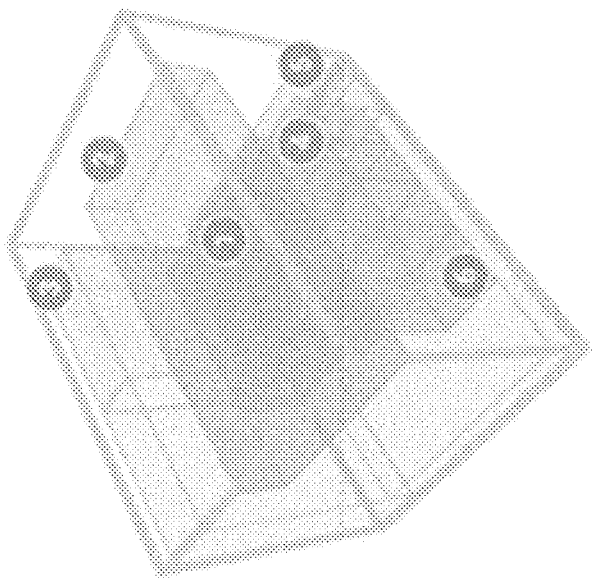
FIG. 5 is an exemplary diagram for explaining shipment packaging information provided through the fulfillment packing service providing device according to the embodiment of the present disclosure.

FIG. 5 is an exemplary diagram for explaining shipment packaging information provided through the fulfillment packing service providing device according to the embodiment of the present disclosure.

Referring to FIG. 5, the service providing device 100 may visually provide a load arrangement form in the outermost hexahedron packaging box according to a solid shape for one or more purchased products ordered by the purchaser terminal 300. Furthermore, the service providing device 100 may provide detailed multi-packaging information on purchased products. The service providing device 100 may provide box information and information according to a product list as 'packing result' information. The box information may include box volume information. In addition, the product list may include single packaging volume information and quantity information corresponding to a list of products purchased by the purchaser.

Meanwhile, the method according to various embodiments of the present disclosure described above may be implemented in the form of installation data to be executed in a terminal device and provided to each server or device while being stored in various non-transitory computer-readable media.

The non-transitory computer-readable medium refers to a medium which stores data semi-permanently and is readable by a device rather than a medium storing data for a short time such as a register, a cache, a memory, and the like. Specifically, the various applications or programs described above may be stored and provided in a non-transitory computer-readable medium such as a CD, a DVD, a hard disk, a Blu-ray disk, a USB, a memory card, or a ROM.

While the invention has been shown and described with respect to various embodiments of the present disclosure, it will be of course understood by those skilled in the art that various modifications may be made without departing from the gist of the invention as defined in the following claims, and it is to be noted that those modifications should not be understood individually from the technical concept and prospect of the present disclosure.

The invention claimed is:
1. A service providing device comprising:
registration circuitry that registers product information received from a seller terminal;
management circuitry that manages load variable information for products included in the product information;
input circuitry that receives purchase information received from a purchaser terminal;

packaging analysis circuitry that analyzes a solid shape packaging method of purchased products included in the purchase information using the product information and the load variable information, and outputs shipment packaging information as a result of the analysis, wherein the packaging analysis circuitry is configured to:
setting a predetermined criterion for a type of classification for each product of the products;
calculating an input amount with respect to packaging subsidiary materials corresponding to the products based on the predetermined criterion that is included in the load variable information for each product;
determining a load order based on the load variable information for each product and a weighted value (WEIGHT) corresponding to a preset importance indicator;
determining a load arrangement form according to a load algorithm, wherein the load algorithm performs fitting so as to be filled in a hexahedral form using solid shape information, generating one or more hexahedral models according to a selective arrangement form of the fitting, and determining a hexahedral model that is calculated as a value that minimizes a volume value of a hollow formed therein among the hexahedral models, wherein the shipping packaging information includes the load order and the load arrangement form; and
visually displaying the load arrangement form via a build interface, wherein the build interface provides a three-hundred and sixty degree (360°) rotational view; and
shipment processing circuitry that provides the purchase information and the shipment packaging information to a warehouse center terminal.

2. The service providing device of claim 1, wherein the packaging analysis circuitry comprises product type analysis circuitry that stores product classification information acquired through the type of classification for each product with respect to one or more products corresponding to the purchase information.

3. The service providing device of claim 2, wherein the packaging analysis circuitry further comprises subsidiary material combination analysis circuitry that analyzes the volume information of the packaging subsidiary materials in accordance with the packaging subsidiary materials that maintain the quality of products according to the product classification information to allow the volume information of the packaging subsidiary materials to be included in the load variable information.

4. The service providing device of claim 3, wherein the packaging analysis circuitry further comprises product volume analysis circuitry that acquires one or more primary product packaging volume information corresponding to a packaging method for each product group classified into a specific item group in the purchased products and determined by the corresponding packaging method based on the product classification information and the load variable information.

5. The service providing device of claim 4, wherein the packaging analysis circuitry further comprises load build analysis circuitry that determines a load method and secondary product package volume information through the analysis of the load order or the load arrangement form based on the load variable information and the primary product packaging volume information.

6. The service providing device of claim 5, wherein the load build analysis circuitry comprises load order determination circuitry that acquires the load order information through reflecting the weighted value (WEIGHT) corresponding to the preset importance indicator with respect to information including at least one of a weight, a hardness, a volume, and a safety level against damage, extracted from the load variable information.

7. The service providing device of claim 6, wherein the load build analysis circuitry further comprises three-dimensional (3D) shape build analysis circuitry that performs solid modeling on the shape of a primary packaging product group based on the primary product packaging volume information, and determines the load arrangement form according to the preset load algorithm using solid shape information acquired through the solid modeling and the load order information.

8. The service providing device of claim 7, wherein the load algorithm generates the one or more hexahedral models as the secondary product packaging volume information.

9. A method of operating a service providing device, the method comprising:
registering product information received from a seller terminal;
managing load variable information for products included in the product information;
receiving purchase information received from a purchaser terminal;
analyzing a solid shape packaging method of purchased products included in the purchase information using the product information and the load variable information and outputting shipment packaging information as a result of the analysis, wherein analyzing the solid shape packaging method further includes:
setting a predetermined criterion for a type of classification for each product of the products;
calculating an input amount with respect to packaging subsidiary materials corresponding to the products based on the predetermined criterion that is included in the load variable information for each product;
determining a load order based on the load variable information for each product and a weighted value (WEIGHT) corresponding to a preset importance indicator;
determining a load arrangement form according to a load algorithm, wherein the load algorithm performs fitting so as to be filled in a hexahedral form using solid shape information, generating one or more hexahedral models according to a selective arrangement form of the fitting, and determining a hexahedral model that is calculated as a value that minimizes a volume value of a hollow formed therein among the hexahedral models, wherein the shipping packaging information includes the load order and the load arrangement form; and
visually displaying the load arrangement form via a build interface, wherein the build interface provides a three-hundred and sixty degree (360°) rotational view; and
providing the purchase information and the shipment packaging information to a warehouse center terminal.

10. The method of claim 9, wherein the analyzing the solid shape packaging method comprises a product type analysis for storing product classification information acquired through the type of classification for each product with respect to one or more products corresponding to the purchase information.

11. The method of claim 10, wherein the analyzing the solid shape packaging method further comprises a subsidiary material combination analysis for analyzing the volume information of packaging subsidiary materials in accordance with the packaging subsidiary materials that maintain the quality of products according to the product classification information to allow the volume information of the packaging subsidiary materials to be included in the load variable information.

12. The method of claim 11, wherein the analyzing the solid shape packaging method further comprises a product volume analysis for acquiring one or more primary product packaging volume information corresponding to a packaging method for each product group classified into a specific item group in the purchased products and determined by the corresponding packaging method based on the product classification information and the load variable information method.

13. The method of claim 12, wherein the analyzing the solid shape packaging method further comprises a load build analysis for determining a load method and secondary product package volume information through the analysis of a load order or a load arrangement form based on the load variable information and the primary product packaging volume information.

14. The method of claim 13, wherein the load build analysis comprises a load order determination for acquiring the load order information through reflecting the weighted value (WEIGHT) corresponding to a preset importance indicator with respect to information including at least one of a weight, a hardness, a volume, and a safety level against damage, extracted from the load variable information.

15. The method of claim 14, wherein the load build analysis further comprises a 3D shape build analysis for performing solid modeling on the shape of a primary packaging product group based on the primary product packaging volume information, and determining the load arrangement form according to a preset load algorithm using solid shape information acquired through the solid modeling and the load order information.

16. The method of claim 15, wherein the load algorithm generates the one or more hexahedral models as the secondary product packaging volume information method.

17. A service providing device comprising:
packaging analysis unit circuitry that determines a load order for purchased products and an arrangement form of products in a load layer based on product information and load variable information on the products to output shipment packaging information, wherein; and
shipment processing circuitry that provides the shipment packaging information according to purchase information to a warehouse center terminal, wherein the packaging analysis circuitry further comprises subsidiary material combination analysis circuitry that analyzes the volume information of packaging subsidiary materials in accordance with the packaging subsidiary materials that maintain the quality of products according to the product classification information to allow the volume information of the packaging subsidiary materials to be included in the load variable information, wherein packaging analysis circuitry is configured to cause:
setting a predetermined criterion for a type of classification for each product of the products;
calculating an input amount with respect to packaging subsidiary materials corresponding to the products based on the predetermined criterion that is included in the load variable information for each product;
determining a load order based on the load variable information for each product and a weighted value (WEIGHT) corresponding to a preset importance indicator;
determining a load arrangement form according to a load algorithm, wherein the load algorithm performs fitting so as to be filled in a hexahedral form using solid shape information, generating one or more hexahedral models according to a selective arrangement form of the fitting, and determining a hexahedral model that is calculated as a value that minimizes a volume value of a hollow formed therein among the hexahedral models, wherein the shipping packaging information includes the load order and the load arrangement form; and
visually displaying the load arrangement form via a build interface, wherein the build interface provides a three-hundred and sixty degree (360°) rotational view.

* * * * *